(12) United States Patent
Murata

(10) Patent No.: US 8,511,358 B2
(45) Date of Patent: Aug. 20, 2013

(54) PNEUMATIC TIRE

(75) Inventor: Takehiko Murata, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 403 days.

(21) Appl. No.: 12/671,187

(22) PCT Filed: Aug. 1, 2008

(86) PCT No.: PCT/JP2008/063897
§ 371 (c)(1),
(2), (4) Date: Jan. 28, 2010

(87) PCT Pub. No.: WO2009/020077
PCT Pub. Date: Feb. 12, 2009

(65) Prior Publication Data
US 2010/0200134 A1 Aug. 12, 2010

(30) Foreign Application Priority Data
Aug. 7, 2007 (JP) ................. 2007-205756

(51) Int. Cl.
*B60C 11/03* (2006.01)
*B60C 11/13* (2006.01)

(52) U.S. Cl.
USPC ............... 152/209.8; 152/209.9; 152/209.24; 152/209.27

(58) Field of Classification Search
USPC ................. 152/209.1, 209.8, 209.9, 209.24, 152/209.27
See application file for complete search history.

(56) References Cited

U.S. PATENT DOCUMENTS

| 5,109,903 | A | | 5/1992 | Watanabe et al. | |
|---|---|---|---|---|---|
| 5,240,053 | A | * | 8/1993 | Baumhofer et al. | 152/209.22 |
| 5,435,364 | A | * | 7/1995 | Hasegawa et al. | 152/209.18 |
| 5,702,545 | A | | 12/1997 | Toyoshima et al. | |
| 6,105,644 | A | | 8/2000 | Ikeda | |
| 2002/0053382 | A1 | * | 5/2002 | Mori et al. | 152/209.9 |
| 2003/0094226 | A1 | | 5/2003 | Colombo et al. | |
| 2004/0134579 | A1 | | 7/2004 | Tanaka | |
| 2007/0000590 | A1 | | 1/2007 | Murata | |

(Continued)

FOREIGN PATENT DOCUMENTS

EP 1652695 5/2006
JP 2-270609 A 11/1990

(Continued)

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

To enhance uneven wear resistance with achieving higher levels of dry grip performance and wet performance, a tread surface 2 is provided with one circumferential main groove 3 in an outer region 2o thereof directed outward of a vehicle and with first and second circumferential main grooves 4 and 5 in an inner region 2i thereof directed inward of the vehicle, a central region Rc between the circumferential main grooves 3 and 4 is formed into a rib 10 extending continuously in the circumferential direction, an outer shoulder region Ro between the circumferential main groove 3 and TEo is formed into a row of outer blocks 12 defined by inclined main grooves 6, and the outer blocks 12 are provided with inclined sub-grooves 13 having an inclination direction different from that of the inclined main grooves 6, thereby dividing each of the outer blocks 12 into a first block portion 12A on a tire equator side and a second block portion 12B on a ground contact edge side.

7 Claims, 10 Drawing Sheets

(56) References Cited

U.S. PATENT DOCUMENTS

| | | |
|---|---|---|
| 2008/0257466 A1 | 10/2008 | Fujita |
| 2009/0114324 A1 | 5/2009 | Ohki et al. |
| 2009/0272474 A1 | 11/2009 | Nagai et al. |

FOREIGN PATENT DOCUMENTS

| | | | |
|---|---|---|---|
| JP | 5-229310 A | | 9/1993 |
| JP | 7-186622 A | | 7/1995 |
| JP | 9-226323 | * | 9/1997 |
| JP | 10-217719 A | | 8/1998 |
| JP | 11-321237 A | | 11/1999 |
| JP | 2000-225811 | * | 8/2000 |
| JP | 2003-170705 A | | 6/2003 |
| JP | 2006-224926 | * | 8/2006 |
| JP | 2007-8342 A | | 1/2007 |
| JP | 2007-131222 A | | 5/2007 |
| JP | 2007-182147 A | | 7/2007 |
| JP | 2007-237795 A | | 9/2007 |
| WO | WO-2005/068225 A1 | | 7/2005 |
| WO | WO-2007/072824 A1 | | 6/2007 |
| WO | WO-2007/145177 A1 | | 12/2007 |

* cited by examiner

PNEUMATIC TIRE

TECHNICAL FIELD

The present invention relates to a pneumatic tire having circumferential main grooves disposed asymmetrically with respect to the tire equator.

BACKGROUND ART

For example, in the Patent Literature 1 mentioned below is proposed a pneumatic tire wherein one outer region circumferential main groove extending in a circumferential direction of a tire is disposed in an outer region of a tread surface which is directed outward of a vehicle with respect to the tire equator, and first and second inner region circumferential main grooves are disposed in an inner region of the tread surface which is directed inward of the vehicle with respect to the tire equator, the first groove extending in the circumferential direction on a tire equator side and the second groove extending in the circumferential direction on a ground contact edge side.

In this tire, it is intended to suppress uneven wear while improving wet performance in such manners as disposing the above-mentioned three circumferential main grooves asymmetrically with respect to the tire equator, and forming each of regions between the circumferential main grooves and regions between the circumferential main grooves and the ground contact edges into rows of blocks by inclined lateral grooves which are inclined at prescribed angles with respect to the circumferential direction of tire.

Patent Literature 1: JP-A-10-217719

DISCLOSURE OF THE INVENTION

Problem to be Solved by the Invention

However, further improvement in tire performances is strongly desired from the viewpoints of recent demands for high running speed and high output of vehicles. In particular, further improvements in dry grip performances and in running stability in marginal running based on evenness of wear are strongly desired for tires to be attached to high-speed vehicles such as sports cars (including race cars).

Accordingly, the present invention is directed to improvement of tires having three circumferential main grooves disposed asymmetrically, and it is an object of the present invention to provide a pneumatic tire having an improved running stability in marginal running by enhancing an uneven wear resistance to achieve good evenness of wear, while achieving higher levels of both a dry grip performance and a wet performance.

Means to Solve the Problem

The present invention provides a pneumatic tire having circumferential main grooves disposed asymmetrically with respect to a tire equator, said pneumatic tire having a tread surface divided by the tire equator to an outer region directed outward of a vehicle and an inner region directed inward of the vehicle, and having one outer region circumferential main groove disposed in said outer region and extending in a circumferential direction of the tire, and first and second inner region circumferential main grooves disposed in said inner region, said first groove extending in the circumferential direction on a tire equator side and said second groove extending in the circumferential direction on a ground contact edge side, said pneumatic tire being characterized in that:

a central region between said outer region circumferential main groove and said first inner region circumferential main groove is formed into a rib extending continuously in the circumferential direction, an outer shoulder region between said outer region circumferential main groove and an outer region ground contact edge is provided with outer inclined main grooves each extending at a slant with respect to the circumferential direction and crossing said outer shoulder region, thereby forming said outer shoulder region as a row of outer blocks disposed at intervals in the circumferential direction, and each of said outer blocks is provided with an inclined sub-groove having an inclination direction different from that of said outer inclined main grooves with respect to the circumferential direction and extending between adjacent said outer inclined main grooves, thereby dividing each of said outer blocks into a first block portion on a tire equator side and a second block portion on a ground contact edge side.

The term "ground contact edge" as used herein means an axially outer edge of a ground contact surface of a tire which comes into contact with a ground when the tire is mounted on a normal rim and inflated to a normal inner pressure and the tire in such a condition is then loaded with a normal load. Further, an axial distance between the ground contact edges is called "tread ground contact width". The term "normal rim" as used herein means a rim defined for every tire in a standardizing system on which the tire is based and, for example, denotes "standard rim" in JATMA, "Design Rim" in TRA and "Measuring Rim" in ETRTO. Also, the term "normal inner pressure" as used herein means an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa. Further, the term "normal load" means a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

A "groove width" denotes a width on the tread surface measured at a right angle to a groove center. In the case that a groove has a cutout portion like a chamfered edge, the width is measured based on an intersection point of an extend line of a groove wall and an extend line of the tread surface.

Effects of the Invention

As stated above, the present invention makes an asymmetric arrangement of grooves in which one circumferential main groove is disposed in the outer region directed outward of a vehicle and two circumferential main grooves are disposed in the inner region. Therefore, a rigidity of the outer region on which large load and external forces act when cornering can be enhanced to increase a cornering force, thus improving the dry grip performance, particularly the cornering performance.

Further, since the outer shoulder region is formed into a row of outer blocks comprising first and second blocks by the outer inclined main grooves and the inclined sub-grooves, a wet performance is imparted thereto. Further, since the sub-grooves are inclined, large widths can be secured for both the first and second blocks and, therefore, the rigidity of the row of outer blocks can be maintained high. Since the inclination directions of the inclined sub-groove and the inclined main groove are opposite to each other, it is possible to prevent local deterioration of rigidity at an intersection part thereof which may occur when the inclined sub-groove and the inclined main groove intersect at an acute angle. As a result, uneven wear at the intersection part can be suppressed, and the running stability in marginal running can be improved by evenness of wear.

Further, since the central region between the outer region circumferential main groove and the first inner region circumferential main groove is formed into a rib extending continuously in the circumferential direction, the dry grip performance in straight running and the uneven wear resistance can be improved. When a narrow circumferential sub-groove extending in the circumferential direction of the tire is further disposed in the central region, the wet performance can be enhanced with maintaining the dry grip performance mentioned above. Furthermore, thermal deterioration of rubber can be prevented by a heat releasing effect of this circumferential sub-groove, and abnormal wear in high speed running owing to the thermal deterioration can be prevented.

| Explanation of Symbols | |
|---|---|
| 2. | Tread surface |
| 2i. | Inner region |
| 2o. | Outer region |
| 3. | Outer region circumferential main groove |
| 4. | First inner region circumferential main groove |
| 5. | First inner region circumferential main groove |
| 6. | Outer inclined main groove |
| 10. | Rib |
| 11. | Circumferential sub-groove |

| Explanation of Symbols | |
|---|---|
| 12. | Outer block |
| 12A. | First block portion |
| 12B. | Second block portion |
| 12R. | Outer block row |
| 13. | Inclined sub-groove |
| 14. | Middle lateral groove |
| 15. | Middle block |
| 15R. | Middle block row |
| 16. | Inner lateral groove |
| 17. | Inner block |
| 17R. | Inner block row |
| C. | Tire equator |
| Ji. | Inner intersection part |
| Jo. | Outer intersection part |
| j. | Intersection point |
| Ki. | Cutout portion |
| Ko. | Cutout portion |
| Kw, Kw3, Kw4, Kw5. | Cutout width |
| Rc. | Central region |
| Ri. | Inner shoulder region |
| Rm. | Middle region |
| Ro. | Outer shoulder region |
| Si. | Inner groove wall surface |
| So. | Outer groove wall surface |
| Wg, Wg3, Wg4, Wg5. | Width of circumferential groove |

BEST MODE FOR CARRYING OUT THE INVENTION

An embodiment of the present invention will now be explained with reference to the accompanying drawings.

Figure 1:
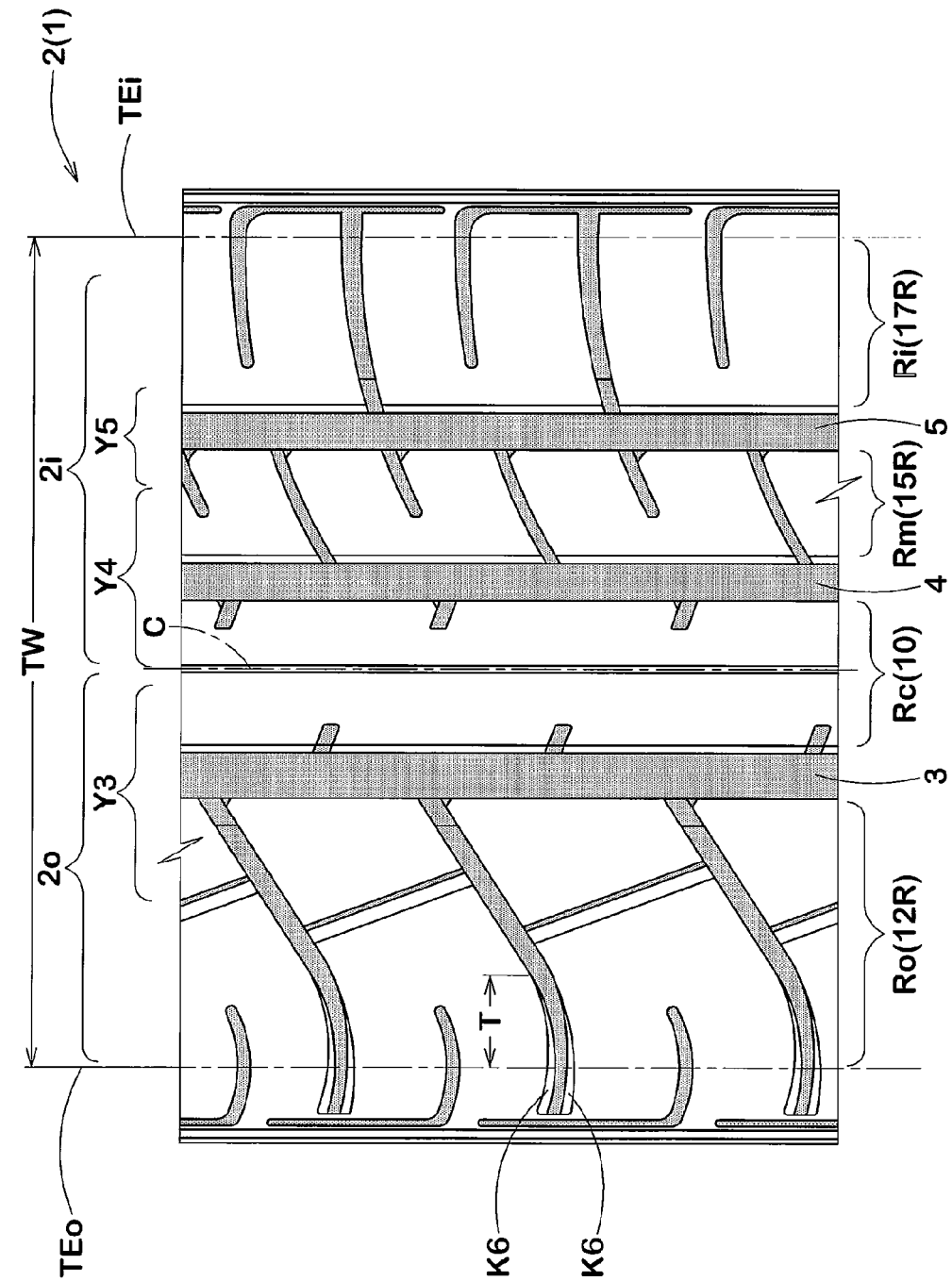
FIG. 1 is a development view showing a tread pattern of a pneumatic tire according to the present invention.

As shown in FIG. 1, a pneumatic tire 1 in this embodiment has a tread surface 2 virtually divided by a tire equator C to an outer region 2o directed outward of a vehicle and an inner region 2i directed inward of the vehicle. In the outer region 2o is disposed a single outer region circumferential main groove 3 extending in a circumferential direction of the tire, and in the inner region 2i are disposed a first inner region circumferential main groove 4 extending in the circumferential direction on the tire equator side and a second inner region circumferential main groove 5 extending in the circumferential direction on a ground contact edge side. Thus, these three circumferential main grooves 3, 4, 5 form, in the tread surface 2, an asymmetrical tread pattern in which these circumferential main grooves are disposed asymmetrically with respect to the tire equator C.

If the number of the circumferential main grooves disposed is two, the tire is short of the drainage property or the like, so it is difficult to secure a sufficient wet performance. If the number of the circumferential main grooves disposed is four, the pattern rigidity, particularly rigidity in the axial direction of the tire, is insufficient, so the tire, particularly the tire intended for high-speed vehicles such as sports cars (including race cars), is short of the dry grip performance. Therefore, it is essential to form three circumferential main grooves from the viewpoint of achieving both the wet performance and the dry grip performance. Although large load and external force act on the outer region 2o in cornering, an axial rigidity of the outer region 2o can be relatively enhanced to increase a cornering force by applying an symmetric arrangement as in this embodiment, thus improving the dry grip performance, particularly the cornering performance.

It is preferable that a range Y3 of a region for forming the outer region circumferential main groove 3 is between a position of 20% of a tread ground contact width TW from a ground contact edge TEo located in the outer region and a position of 46% of the tread ground contact width TW from the ground contact edge TEo. The whole of the circumferential main groove 3 is formed in this region range Y3. It is more preferable that the region range Y3 is between a position of 25% of the tread ground contact width TW and a position of 35% of the tread ground contact width TW. Further, it is preferable that a range Y4 of a region for forming the first inner region circumferential main groove 4 is between a position of 50% of the tread ground contact width TW from the ground contact edge TEo located in the outer region and a position of 70% of the tread ground contact width TW from the ground contact edge TEo. Further, it is preferable that a range Y5 of a region for forming the second inner region circumferential main groove 5 is between a position of 70% of the tread ground contact width TW from the ground contact edge TEo located in the outer region and a position of 82% of the tread ground contact width TW from the ground contact edge TEo.

A rigidity balance in the axial direction of the tire can be made proper to further enhance the dry grip performance (particularly cornering performance) by forming the circumferential main grooves 3, 4, 5 in such region ranges Y3, Y4, Y5.

Figure 2A:
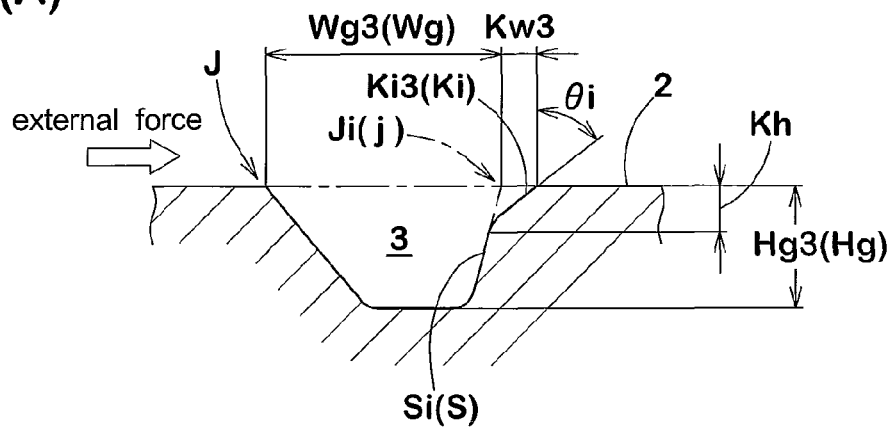
FIGS. 2(A) to 2(C) are cross sectional views illustrating a cutout portion in respective circumferential main grooves.
Figure 2B:
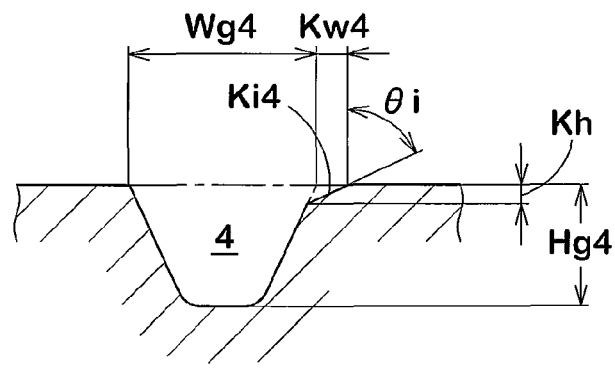
Figure 2C:
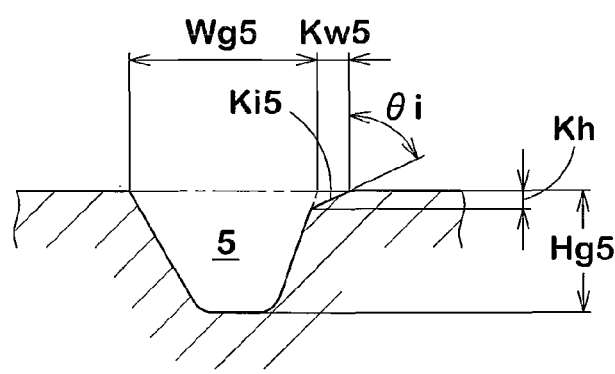

The circumferential main grooves 3, 4, 5 have a groove width Wg3, Wg4, Wg5 (generically referred to as Wg) of at least 4.0 mm, as shown in FIGS. 2(A) to 2(C). In this embodiment, the width Wg3 of the circumferential main groove 3 is set larger than the widths Wg4 and Wg5 of the circumferential main grooves 4 and 5, thereby suppressing lowering of the balance of drainage performance owing to the asymmetric arrangement. From the viewpoint of a balance between the dry grip performance and the wet performance, it is preferable that the groove width Wg3 is from 5 to 9% of the tread ground contact width TW, and each of the groove widths Wg4 and Wg5 is from 4 to 8% of the tread ground contact width TW. In the circumferential main grooves 3, 4 and 5, it is preferable from the viewpoint of uneven wear resistance that a groove upper edge which is an intersection part J at which a groove wall surface S intersects with the tread surface 2, extends straight. Further, it is preferable from the viewpoint of drainage performance that these grooves 3, 4 and 5 are straight grooves that extend straight with keeping the cross sectional shape thereof constant.

It is preferable that groove depths Hg3, Hg4 and Hg5 (generically referred to as Hg) of the circumferential main grooves 3, 4 and 5 are identical to each other within the range of 6.5 to 9.0 mm, especially 7.0 to 8.0 mm. The reason is that if the groove depth Hg is large, it is required for preventing damages at groove bottom to increase the thickness of the tread rubber and, as a result, heat generation during running tends to increase to cause, particularly in high speed vehicle tire, abnormal wear (premature wear) owing to thermal deterioration of rubber. Therefore, from the viewpoints of drainage performance and prevention of thermal deterioration, it is preferable to select the groove depth from the range mentioned above.

In this embodiment, as shown in FIGS. 2(A) to 2(C), each of the circumferential main grooves 3, 4 and 5 is provided, at an inner intersection part Ji at which the tread surface 2 intersects with an inner groove wall surface Si directed inward of the vehicle, with a cutout portion Ki3, Ki4 or Ki5 (generically referred to as Ki) that an intersection point "j" of the surfaces 2 and Si is cut away, like a chamfered edge. The reason is that since a large external force acts on the tread surface in a direction from outside of a vehicle toward inside of the vehicle at the time of cornering, wearing is concentrated to the inner intersection part Ji particularly in marginal running in a race circuit and the dry grip performance tends to change during running. Therefore, change in dry grip performance is suppressed by previously forming the cutout portion Ki at the inner intersection part Ji, thereby securing the running stability.

An external force in cornering, that is, wearing, is larger in the outer region 2o than the inner region 2i. Therefore, it is preferable that an axial cutout width Kw3 of the cutout portion Ki3 formed in the outer region circumferential main groove 3 is larger than cutout widths Kw4 and Kw5 of the cutout portions Ki4 and Ki5 formed in the first and second inner region circumferential main grooves 4 and 5. However, if the cutout portions Ki are too large, the ground contact area is decreased and it is disadvantageous for the wet grip performance. Therefore, it is preferable that each of the cutout widths Kw3, Kw4 and Kw5 falls within the range of 0.5 to 2.0% of the tread ground contact width TW. Further, it is preferable that an inclination angle $\theta i$ of each cutout portion Ki with respect to a normal line to the tread surface 2 is from 55 to 75°. Further, it is preferable that a depth Kh of each cutout portion Ki is from 5 to 25% of the groove depth Hg of a circumferential main groove to be provided with each cutout portion Ki.

Figure 3:
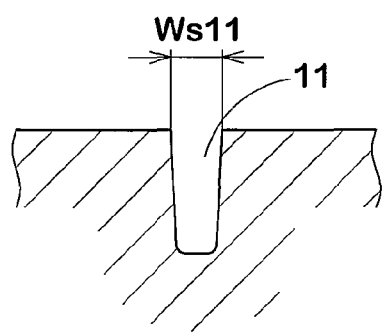
FIG. 3 is a cross sectional view illustrating a circumferential sub-groove.

In straight running, the ground contact pressure is the largest at a central region Rc located between the outer region circumferential main groove 3 and the first inner region circumferential main groove 4. Therefore, if a block row is formed in the central region Rc, the rigidity becomes insufficient, thus resulting in deterioration of straight running performance, and there is a disadvantage that marked heel and toe wear occurs in the block row. Therefore, the central region Rc is formed as a rib 10 continuously extending in the circumferential direction of the tire without being divided by lateral grooves. The rib 10 is provided with a narrow circumferential sub-groove 11 (the cross section of which is shown in FIG. 3) extending continuously in the circumferential direction and having a groove width Ws 11 of less than 4.0 mm. The circumferential sub-groove 11 can enhance the wet performance in the central region Rc with maintaining its rigidity high. Furthermore, abnormal abrasion in high speed running owing to thermal deterioration of a rubber can be suppressed by a heat radiation effect of the sub-groove 11. In this embodiment is shown a case where the circumferential sub-groove 11 is disposed on the tire equator C.

Figure 4:
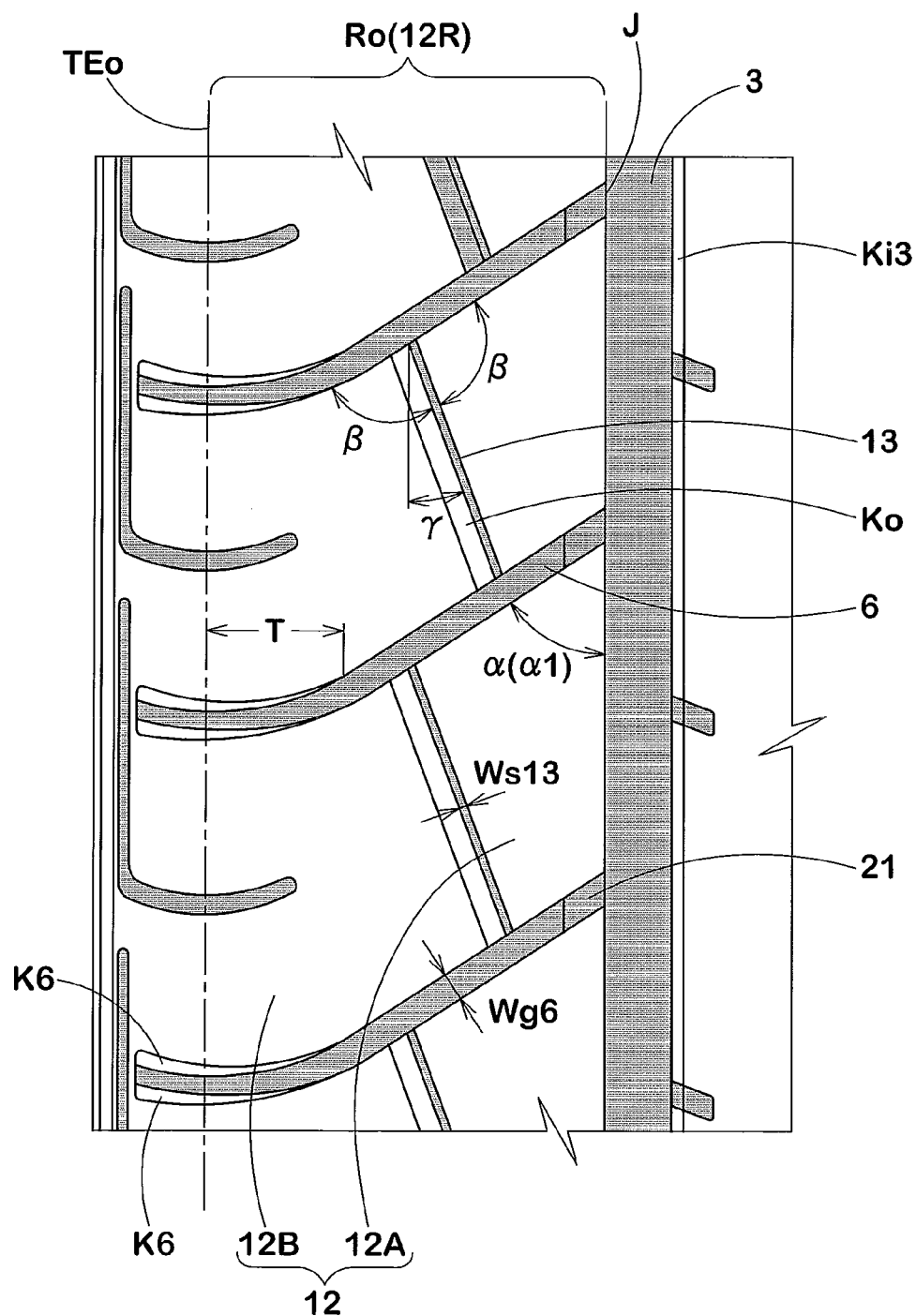
FIG. 4 is a development view of a tread pattern showing an outer shoulder region in an enlarged form.

In an outer shoulder region Ro located between the outer region circumferential main groove 3 and the ground contact edge TEo are disposed, as shown in FIG. 4 in an enlarged form, outer inclined main grooves 6 each extending at an angle $\alpha$ to the circumferential direction and crossing the outer shoulder region Ro, whereby the outer shoulder region Ro is formed as an outer block row 12R in which outer blocks 12 are disposed at intervals in the circumferential direction.

In the outer shoulder region Ro are further disposed inclined sub-grooves 13 each of which is inclined in a direction opposite to the inclination direction of the outer inclined main grooves 6 with respect to the circumferential direction and extends between the outer inclined main grooves 6, 6, thereby dividing each of the outer blocks 12 into a first block portion 12A on a tire equator side and a second block portion 12B on a ground contact edge side. In this embodiment, the outer inclined main grooves 6 have a groove width Wg6 of 4.0 mm or more, and the inclined sub-grooves 13 are formed as narrow grooves each having a groove width Ws13 of less than 2.5 mm.

The above-mentioned angle $\alpha$ of the outer inclined main grooves 6 is from 40 to 90°. The outer inclined main grooves form an angle $\alpha 1$ of 40 to 60° at intersecting parts with the circumferential main groove 3. The angle $\alpha$ gradually increases toward the ground contact edge TEo. Each outer inclined main groove 6 can include a linear part extending at a constant angle α. The outer inclined main grooves 6 can smoothly discharge rainwater to the outside of the ground contact surface based on the inclination thereof and therefore can enhance the wet performance with suppressing lowering of circumferential rigidity.

Figure 5:
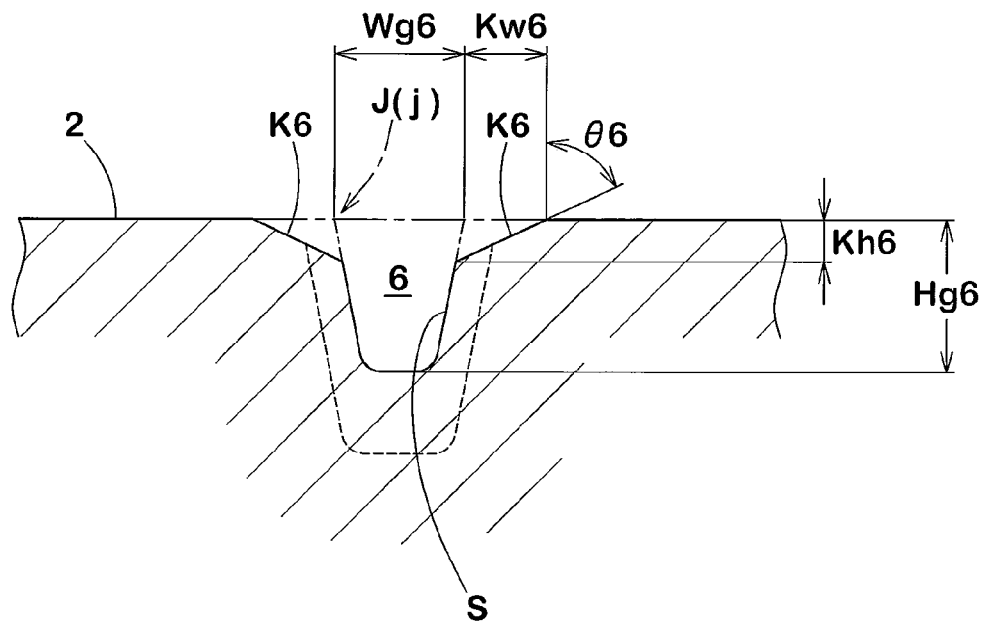
FIG. 5 is a cross sectional view illustrating a cutout portion in an inclined main groove.

As shown in FIG. 5, a portion on the ground contact edge side of each inclined main groove 6 is provided, at both intersection parts J at which groove wall surfaces S of the inclined main groove 6 intersect with the tread surface 2, with cutout portions K6 that intersection points "j" of the surfaces 2 and S are cut away, like a chamfered edge. Distance T (shown in FIG. 4) from the ground contact edge TEo to an axially inner end of the cutout portion K6 is at most 15% of the tread ground contact width TW, and cutout width Kw6 of the cutout portion K6 gradually increases toward the ground contact edge TEo. It is preferable that inclination angle θ6 of the cutout portions K6 to a normal line to the tread surface 2 is from 55 to 80°. Further, it is preferable that cutout depth Kh6 at the ground contact edge TEo is from 5 to 95% of a groove depth Hg6 of the inclined main groove 6. Such cutout portions K6 can suppress abrasion of the intersection parts J of the outer blocks 12 and therefore can prevent the traction from lowering with minimizing decrease of the ground contact area.

Figure 6:
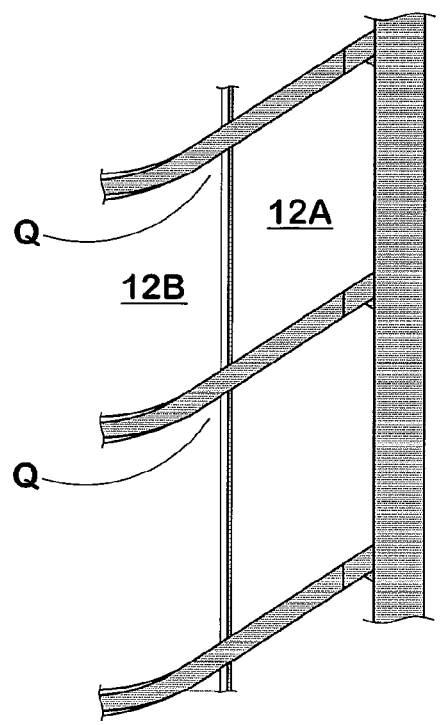
FIG. 6 is a plan view for illustrating operation and effect of an inclined sub-groove.

Since the inclination direction of the inclined sub-grooves 13 is different from that of the inclined main grooves 6, it is possible to make the axial widths of the first and second block portions 12A and 12B large and, therefore, it is possible to suppress lowering of the axial rigidity of the blocks 12, while enhancing the wet performance. Further, since the inclination directions are different, it is possible to set a large intersection angle β between the inclined sub-groove 13 and the inclined main groove 6. If the inclined sub-grooves 13 extend in the circumferential direction or are inclined in the same direction as the inclined main grooves 6, a sharply-angled corner Q is formed on either one of the first and second block portions 12A and 12B, as shown in FIG. 6. Since the sharply-angled corner Q is low in rigidity and is easy to deform, it is hard to be worn away by friction with a road and causes uneven wear. The rigidity can be prevented from lowering at the corner to suppress uneven wear by disposing the inclined sub-grooves 13 in an inclination direction different from the inclined main grooves 6. For this purpose, it is preferable that an angle γ of the inclined sub-groove 13 to the circumferential direction is from 5 to 60°, especially 10 to 30°. Further, it is preferable that the intersection angle β mentioned above is from 90°±20°, especially 90°±15°.

Figure 7A:
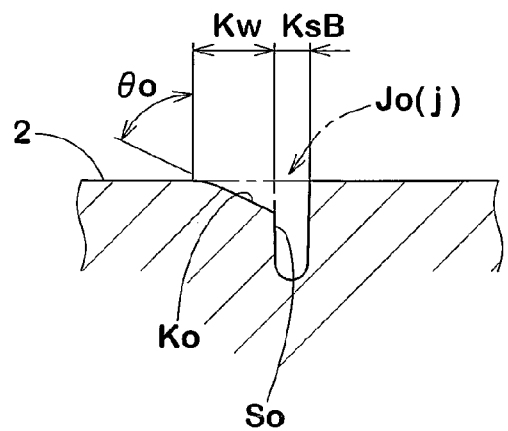
FIGS. 7(A) and 7(B) are cross sectional views for illustrating operation and effect of a cutout portion in the inclined sub-groove.
Figure 7B:
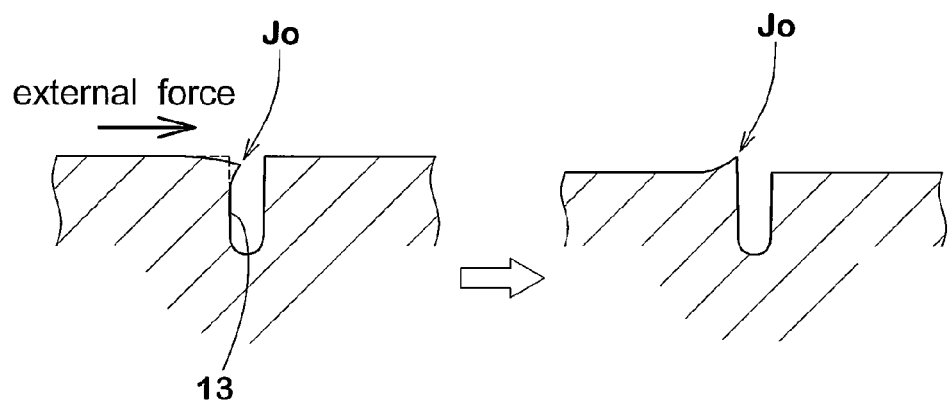

The inclined sub-groove 13 is provided, at an outer intersection is part Jo where the tread surface 2 intersects with an outer groove wall surface So directed outward of a vehicle, with a chamfered edge-like cutout portion Ko that an intersection point "j" of them is cut away, as shown in FIG. 7(A) showing its cross section. The reason is that since the outer intersection part Jo deforms to fall into the inclined sub-groove 13 as shown in FIG. 7(B) by an external force acting on in cornering, friction with a road occur less frequently, so the outer intersection part Jo remains in the form of a protrusion, thus generating uneven wear. Therefore, in the inclined sub-grooves 13, a cutout portion Ko is formed at the outer intersection part Jo which is in an opposite manner to the circumferential main grooves 3, 4 and 5. It is preferable in the same manner as the inner cutout portion Ki that a cutout width Kw of the outer cutout portion Ko is from 0.5 to 2.0% of the tread ground contact width TW, and an inclination angle θo of the cutout portion Ko to a normal line to the tread surface 2 is from 55 to 75°.

Figure 8:
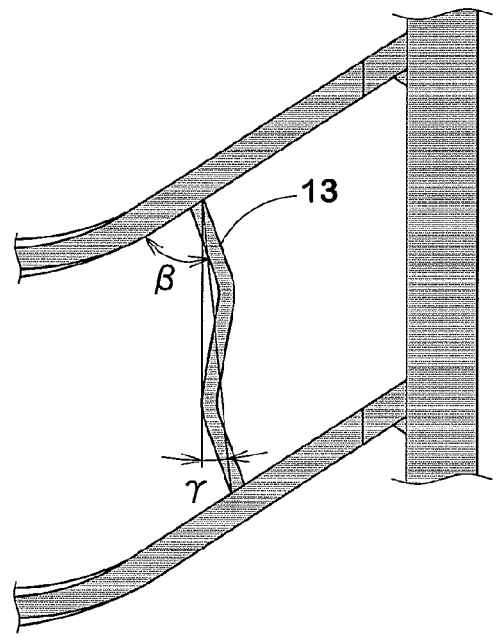
FIG. 8 is a plan view showing another example of the inclined sub-groove.

In this embodiment, a straight groove is exemplified as the inclined sub-groove 13, but the inclined sub-groove 13 may be, for instance, an S-shaped curved groove as shown in FIG. 8 in order to make the block rigidity uniform. In that case, the angle γ mentioned above is defined by an angle of a straight line connecting both ends of the inclined sub-groove 13.

Figure 9:
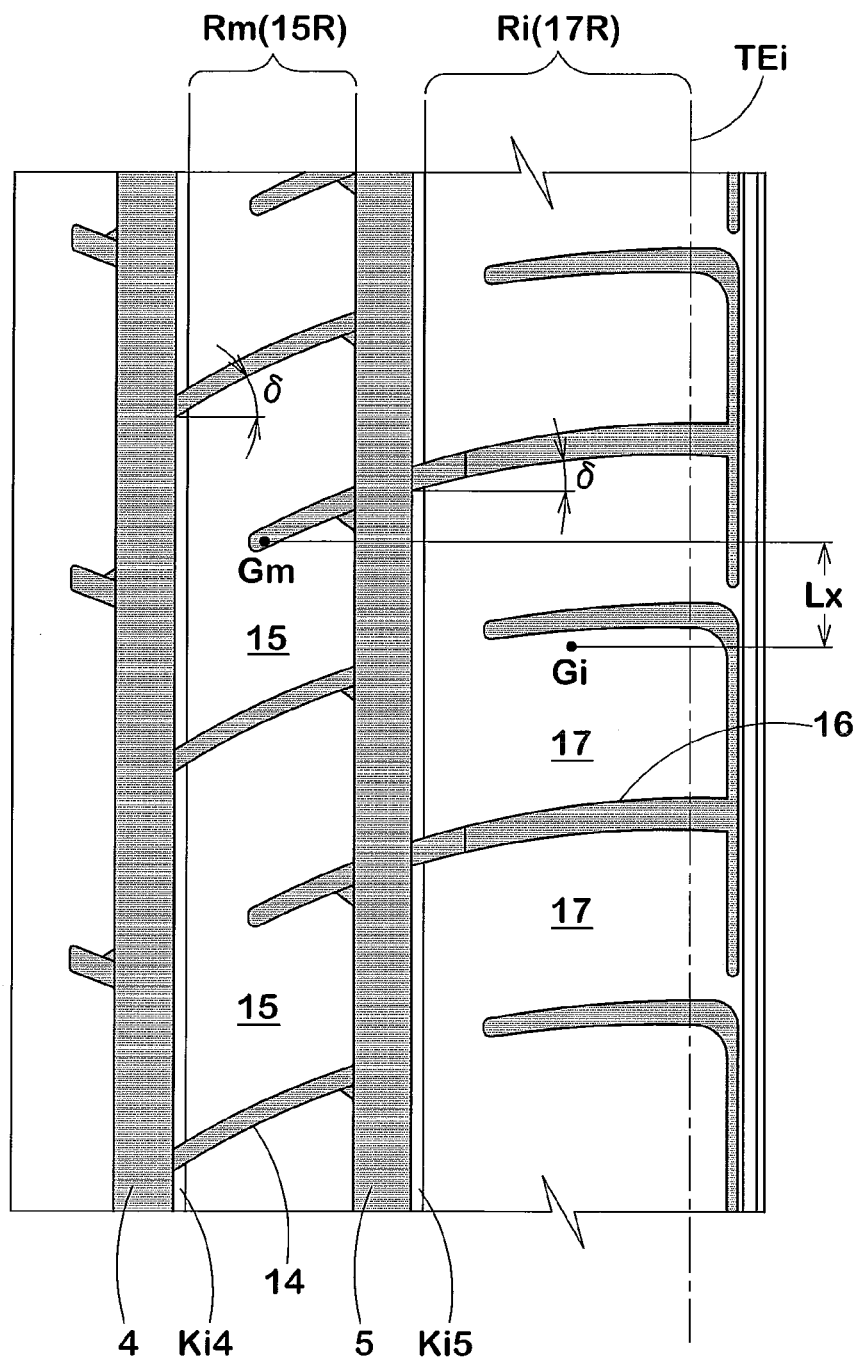
FIG. 9 is a development view of a tread pattern showing a middle region and an inner shoulder region in an enlarged form.

As shown in FIG. 9 in an enlarged form, middle lateral grooves 14 are disposed in a middle region Rm located between the first inner region circumferential main groove 4 and the second inner region circumferential main groove 5 to cross the middle region Rm in the axial direction of the tire, whereby middle blocks 15 are formed as a row 15R of middle blocks 15 disposed at intervals in the circumferential direction of the tire. An inner shoulder region Ri between the second inner region circumferential main groove 5 and an inner region ground contact edge TEi is also provided with inner lateral grooves 16 crossing the inner shoulder region Ri in the axial direction of the tire, thereby forming the inner shoulder region Ri as a row 17R of inner blocks 17 disposed at intervals in the circumferential direction.

The lateral grooves 14 and 16 extend at an angle δ of at most 30°, preferably at most 20°, with respect to the axial direction of the tire. Preferably, these grooves 14 and 16 are inclined in the same direction as the inclination direction of the inclined main grooves 6. These lateral grooves 14 and 16 serve to enhance a property of cutting a water film and a drainage property, thereby supplementing the drainage property in the inner region 2i and securing a high level of the wet performance of the entire tread surface 2. For this purpose, it is preferable that a proportion of an area of land portions included in the inner region 2i to an area of land portions included in the ground contact surface is from 45 to 49%, especially 47%. In other words, it is preferable from the viewpoint of grip performance in cornering that a proportion for land portions included in the outer region 2o is from 51 to 55%, especially 53%. As to the entire ground contact surface, it is preferable that the land proportion is from 70 to 75%, especially 73%. If the proportion of land portions included in the inner region is less than 45%, the ground contact area becomes too small in a vehicle with camber and the traction performance cannot be sufficiently exhibited.

Figure 10A:
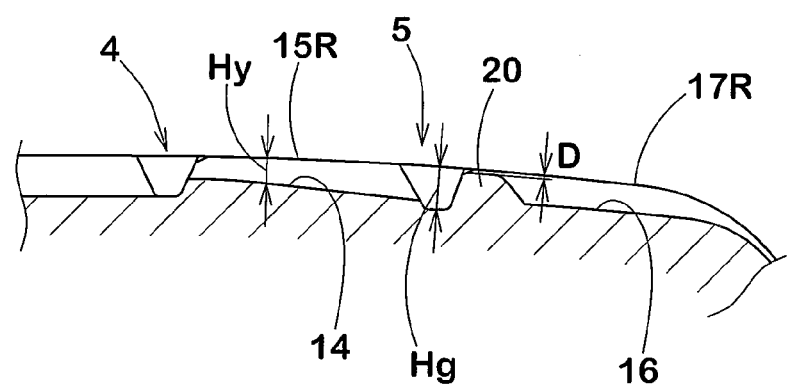
FIGS. 10(A) and 10(B) are a cross sectional view along a groove center line of a middle lateral groove and an inner lateral groove, and a cross sectional view along a groove center line of the inclined main groove.
Figure 10B:
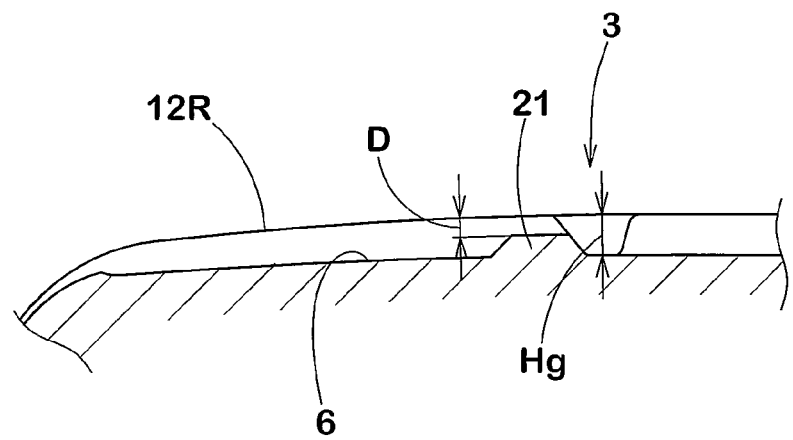

In this embodiment, as shown in FIG. 10(A), groove depth Hy of the middle lateral grooves 14 is gradually decreased from a ground contact edge TEi side toward a tire equator C side, whereby the pattern rigidity in the middle block row 15R is enhanced to suppress uneven wear such as heel and toe wear. Further, for the same purpose, as shown in FIGS. 10(A) and 10(B), a tie bar 20 or 21 which bulges from a groove bottom is formed in each inner lateral groove 16 at the intersection with the circumferential main groove 5, or in each inclined main groove 6 at the intersection with the circumferential main groove 3, whereby the pattern rigidity in the outer block row 12R or the pattern rigidity in the inner block row 17R is enhanced to suppress uneven wear such as heel and toe wear. Preferably, the depth D of the tie bar 20 or 21 from the tread surface 2 is from 5 to 70%, especially 15 to 55%, of the depth Hg of the adjacent circumferential main groove.

In this embodiment, the number of blocks formed in the middle block row 15R is the same as the number of blocks formed in the inner block row 17R, and as to a middle block 15 and an inner block 17 which are adjacent to each other in the axial direction, position of the center of gravity Gm of the middle block 15 and position of the center of gravity Gi of the inner block 17 are shifted from each other in the circumferential direction. The shift length Lx is from 35 to 65% of an average pitch length obtained by dividing a circumferential length of the middle region Rm by the number of blocks formed. Such an arrangement is helpful for achieving evenness in wear since a difference in block rigidity can be decreased and smoother ground contact is achieved.

Figure 11:
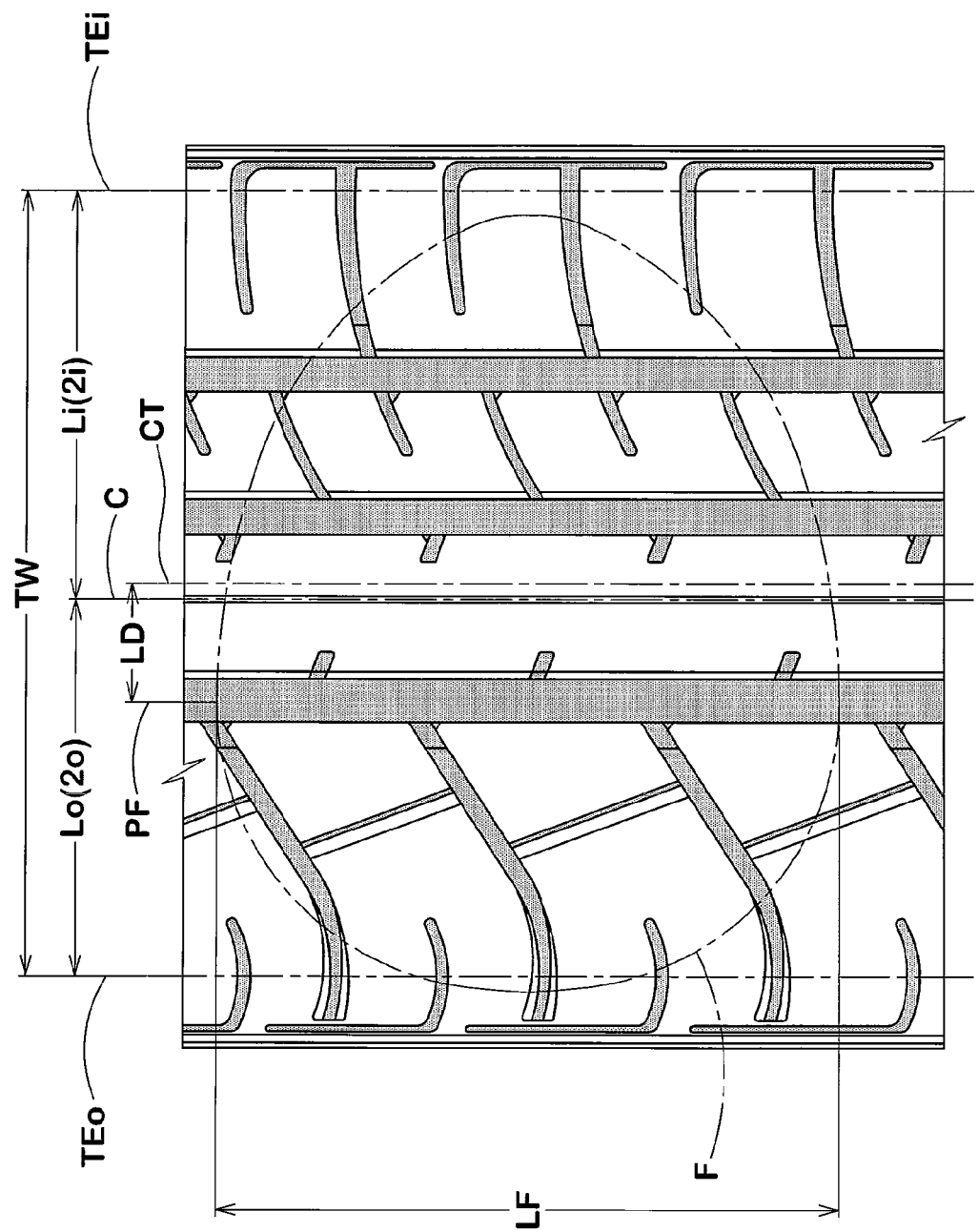
FIG. 11 is a view showing a shape of a footprint in cornering together with a tread pattern.

Further, in this embodiment, a tread profile in a meridian cross section of the tire including the tire axis is dissimilated between the outer region 2o and the inner region 2i so that, as shown in FIG. 11, a distance Lo from the tire equator C to the ground contact edge TEo on the vehicle outer side is smaller than a distance Li from the tire equator C to the ground contact edge TEi on the vehicle inner side. This is helpful for further enhancing the cornering performance, since a maximum ground contact length position PF at which a ground contact length LF reaches the maximum in a footprint F in cornering can be moved toward the tire equator side. For this purpose, it is preferable to form the tread profile bilaterally asymmetrically so that an axial distance LD from a ground contact center CT between the ground contact edges TEo and TEi to the maximum ground contact length position PF in the footprint F obtained in cornering falls within the range of 0.16 to 0.22 times the tread ground contact width TW. If the distance LD is more than 0.22 times the tread ground contact width TW, the cornering performance is not sufficiently enhanced, and if the distance LD is less than 0.16 times the tread ground contact width TW, an adverse influence tends to be exerted on the straight running stability. The term "distance LD" as used herein means an axial distance up to the maximum ground contact length position PF in a footprint F obtained when the tire is mounted on a normal rim, inflated to a normal inner pressure and loaded with a normal load and a slip angle of 4° is then applied to the tire (under cornering condition).

Figure 12:
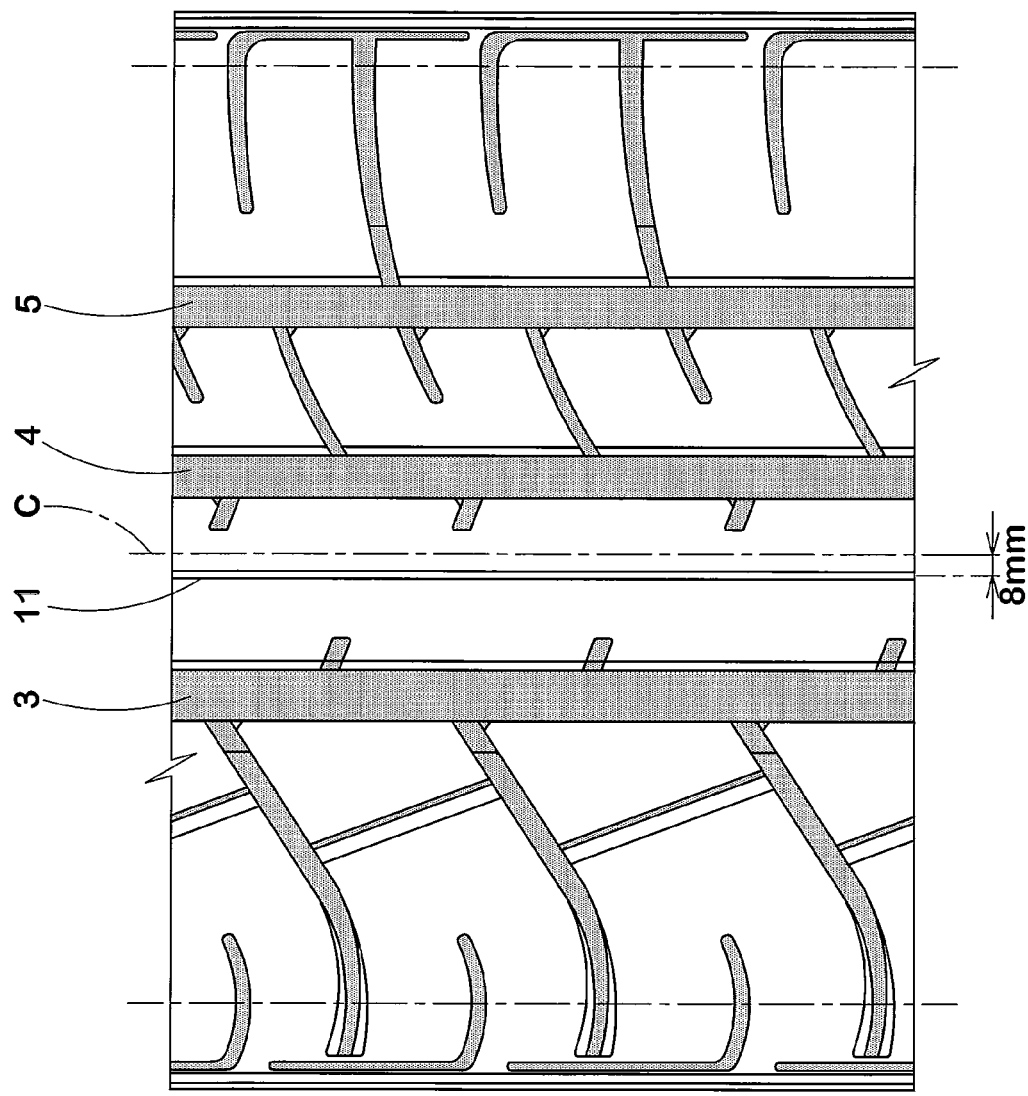
FIG. 12 is a development view showing another example of the tread pattern.

Another example of the tread pattern is shown in FIG. 12. In this drawing is shown a case where each of the circumferential main grooves 3, 4 and 5 and sub-groove 11 is disposed at a location shifted toward the vehicle outer side by 8 mm as compared with the pattern shown in FIG. 1. The wet performance in cornering is enhanced by such an arrangement. Further, since the pattern rigidity of the inner region 2i is enhanced, the ground contact area is increased when used in a vehicle with a large camber and therefore the traction performance can be improved.

Figure 13:
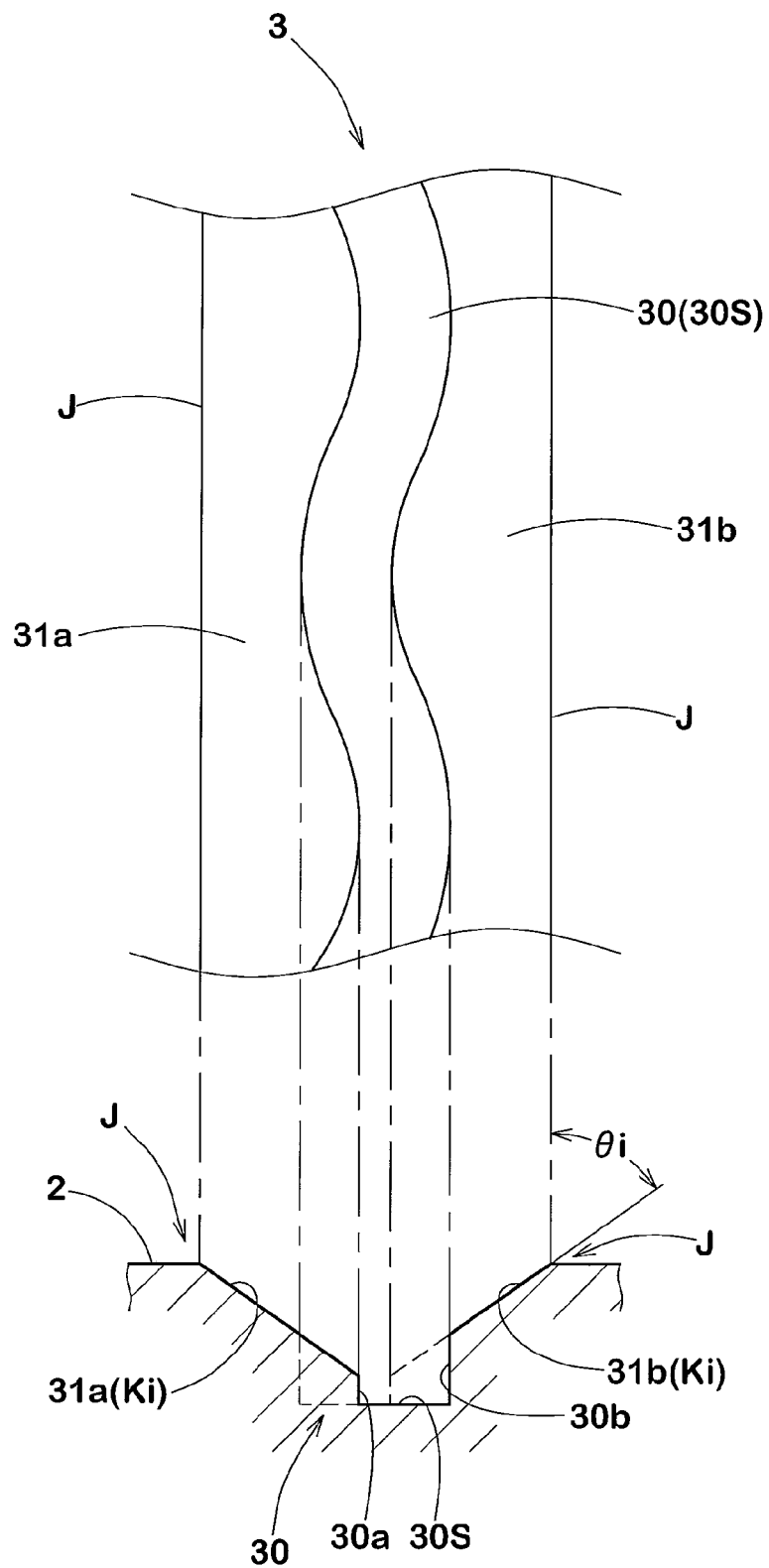
FIG. 13 is a view showing another example of the circumferential main groove.

Another example of the circumferential main groove 3 is shown in FIG. 13. This circumferential main groove 3 is formed into a wave-like groove wherein a groove bottom portion 30 is in the form of a wave that the amplitude is changed in a wavy form. Specifically, the groove bottom portion 30 comprises a groove bottom 30S, and lower groove wall portions 30a and 30b which rise up from both edges of the groove bottom 30. Each of the lower groove wall portions 30a and 30b is continuous with each of upper groove wall portions 31a and 31b which extend from upper edges of the lower groove wall portions 30a and 30b to the tread surface 2. At least the upper groove wall portions 31a and 31b have a constant inclination angle over the full circumferential length. Height of an intersection position of the upper and lower groove wall portions 31a and 30a and height of an intersection position of the upper and lower groove wall portion 31b and 30b are changed in the circumferential direction. Thus, groove upper edges which are the intersection parts J at which the upper groove wall portions 31a and 31b intersect with the tread surface 2, extends straight in the circumferential direction, whereby the uneven wear resistance and the drainage performance are maintained on high levels. In case of the wave-like groove, the upper groove wall portions 31a and 31b constitute cutout portions Ki and, therefore, in this embodiment, the inclination angle θI of the groove wall portions 31a and 31b is set to a range of 55 to 75°. Further, since the wave-like groove has a groove bottom portion 30 in the form of a wave, the tread portion is hard to undergo a flexural deformation at the circumferential main groove 3 and, therefore, the pattern rigidity is increased to enhance the dry grip performance in cornering. Such a wave-like groove may also be applied to the circumferential main grooves 4 and 5.

While particularly preferable embodiments of the present invention have been described with reference to the drawings, the present invention can be modified into various embodiments and carried out without being limited to only the embodiments shown in the drawings.

EXAMPLES

Radial tires (tread width 240 mm) for passenger cars having a size of 255/40R20 and a basic tread pattern shown in FIG. 1 were manufactured based on the specifications shown in Table 1, and were tested with respect to drainage performance, cornering performance, wear resistance and thermal deterioration. The results are shown in Table 1. Specifications other than those described in Table 1 are substantially common to all tires. A tire of Comparative Example 1 is the same as that of Example 1 except that the inclined sub-groove 13 extends in the circumferential direction (γ=0°) as shown in FIG. 6. A tire of Example 5 has a pattern shown in FIG. 12, and the circumferential main grooves 3, 4 and 5 and the circumferential sub-groove 11 are shifted toward the vehicle outer side, respectively, by 8 mm as compared with the pattern shown in FIG. 1. In Example 6, only the circumferential main groove 3 is formed into a wave-like groove shown in FIG. 13, and the width Kw3 of the cutout portion Ki which is a width of the groove wall portion 31a, 31b of the wave-like groove changes within the range of 3.0 to 6.5 mm, and the depth Kh of the cutout portion Ki which is a height of the groove wall portion 31a, 31b of the wave-like groove changes within the range of 1.5 to 6.0 mm.

(1) Drainage Performance

The tires were attached to four wheels of a vehicle (Japanese 3,500 cc 4WD passenger car) under conditions of rim 9.5JJ and inner pressure 230 kPa. The car was run on a 100 m radius circular asphalt road provided with a puddle having a depth of 10 mm and a length of 20 m with stepwise increasing the speed for entering into the puddle. The lateral acceleration (lateral G) was measured, and the average lateral G of the front wheels for the speed range of 50 to 80 km/h was calculated. The results are shown as an index based on the result of Comparative Example 1 regarded as 100. The larger the value, the better the drainage performance.

(2) Cornering Performance

The above-mentioned vehicle was run on a test course and a handling road. The grip level and marginal level in cornering were evaluated by a driver's feeling. The results are shown as an index based on the result of Comparative Example 1 regarded as 100. The larger the value, the better.

(3) Wear Resistance

The above-mentioned vehicle was run 30 km on a test course in a marginal running mode, and chipping of rib and uneven wear were visually observed. The results are shown as an index based on the result of Comparative Example 1 regarded as 100. The larger the value, the better the wear resistance.

(4) Thermal Deterioration

The above-mentioned vehicle was run the test course 10 times in a marginal running mode, and the degree of lowering in grip during running was evaluated by a driver's feeling. The results are shown as an index based on the result of Comparative Example 1 regarded as 100. The larger the value, the smaller the degree of lowering in grip owing to thermal deterioration and accordingly the better.

TABLE 1

|  | Com. Ex. 1 | Ex. 1 | Ex. 2 | Ex. 3 | Ex. 4 | Ex. 5 | Ex. 6 |
|---|---|---|---|---|---|---|---|
| Pattern | FIG. 6 | FIG. 1 | FIG. 1 | FIG. 1 | FIG. 1 | FIG. 12 | FIG. 13 |
| Circumferential main groove 3 | | | | | | | |
| Groove width Wg3 (mm) | 14.5 | 14.5 | 14.5 | 12.5 | 14.5 | 14.5 | 14.5 |
| Groove depth Hg3 (mm) | 7.5 | 7.5 | 7.5 | 7.5 | 7.5 | 7.5 | 7.5 |
| Cutout width Kw3 (mm) | 2.5 | 2.5 | 0 | 2.5 | 2.5 | 2.5 | 3.0 to 6.5 |
| Cutout depth Kh (mm) | 2 | 2 | 0 | 2 | 2 | 2 | 1.5 to 6.0 |
| Circumferential main groove 4 | | | | | | | |
| Groove width Wg4 (mm) | 11.5 | 11.5 | 11.5 | 12.5 | 11.5 | 11.5 | 11.5 |
| Groove depth Hg4 (mm) | 7.5 | 7.5 | 7.5 | 7.5 | 7.5 | 7.5 | 7.5 |
| Cutout width Kw4 (mm) | 2 | 2 | 0 | 2 | 2 | 2 | 2 |
| Cutout depth Kh (mm) | 1.5 | 1.5 | 0 | 1.5 | 1.5 | 1.5 | 1.5 |
| Circumferential main groove 5 | | | | | | | |
| Groove width Wg5 (mm) | 12 | 12 | 12 | 12.5 | 12 | 12 | 12 |
| Groove depth Hg5 (mm) | 7.5 | 7.5 | 7.5 | 7.5 | 7.5 | 7.5 | 7.5 |
| Cutout width Kw5 (mm) | 2 | 2 | 0 | 2 | 2 | 2 | 2 |
| Cutout depth Kh (mm) | 1.5 | 1.5 | 0 | 1.5 | 1.5 | 1.5 | 1.5 |
| Circumferential sub-groove 11 | | | | | | | |
| Groove width Ws11 (mm) | 2 | 2 | 2 | 2 | none | 2 | 2 |
| Inclined main groove 6 | | | | | | | |
| Inclination angle α1 (degree) | 55 | 55 | 55 | 55 | 55 | 55 | 55 |
| Inclined sub-groove 13 | | | | | | | |
| Direction*1 | Circumferential direction | Inclination (inverse) | Inclination (inverse) | Inclination (inverse) | Inclination (inverse) | Inclination (inverse) | Inclination (inverse) |
| Angle γ (degree) | 0 | 20 | 20 | 20 | 20 | 20 | 20 |
| Angle β (degree) | 55 | 75 | 75 | 75 | 75 | 75 | 75 |
| Proportion of land portions included in inner region (%) | 47 | 47 | 47 | 47 | 47 | 47 | 47 |
| Proportion of land portions included in outer region (%) | 53 | 53 | 53 | 53 | 53 | 53 | 53 |
| Drainage performance | 100 | 100 | 100 | 90 | 100 | 110 | 80 |
| Cornering performance | 100 | 100 | 110 | 115 | 100 | 110 | 115 |
| Wear resistance | 100 | 110 | 90 | 115 | 110 | 110 | 115 |
| Thermal deterioration | 100 | 100 | 100 | 100 | 90 | 95 | 100 |

*1"Inclination (inverse)" means that inclination direction of the inclined sub-groove 13 is different from inclination direction of inclined main groove 6.

What is claimed is:

1. A pneumatic tire having three circumferential main grooves disposed asymmetrically with respect to a tire equator, said pneumatic tire having a tread surface divided by the tire equator to an outer region, meaning at the vehicle outer side when the tire is mounted on the vehicle, and an inner region, meaning at the vehicle inner side when the tire is mounted on the vehicle, and having one single outer region circumferential main groove disposed in said outer region and extending in a circumferential direction of the tire, and first and second inner region circumferential main grooves disposed in said inner region, said first inner region circumferential main groove extending in the circumferential direction on a tire equator side and said second inner region circumferential main groove extending in the circumferential direction on a ground contact edge side, wherein:

a central region between said outer region circumferential main groove and said first inner region circumferential main groove is formed into a rib extending continuously in the circumferential direction, an outer shoulder region between said outer region circumferential main groove and an outer region ground contact edge is provided with outer inclined main grooves each extending at a slant with respect to the circumferential direction and crossing said outer shoulder region, thereby forming said outer shoulder region as a row of outer blocks disposed at intervals in the circumferential direction, each of said outer blocks is provided with an inclined sub-groove having an inclination direction different from that of said outer inclined main grooves with respect to the circumferential direction and extending between adjacent said outer inclined main grooves, thereby dividing each of said outer blocks into a first block portion on a tire equator side and a second block portion on a ground contact edge side, said outer region circumferential main groove, said first inner region circumferential main groove and said second inner region circumferential main groove are provided, at only an inner intersection part at which the tread surface intersects with an inner groove wall surface, meaning at the vehicle inner side, of each of the circumferential main grooves, with a chamfered edge-like cutout portion, and said inclined sub-groove is provided, at only an outer intersection part where its outer groove wall surface, meaning at the vehicle outer side, intersects with the tread surface, with a chamfered edge-like cutout portion.

2. The pneumatic tire of claim 1, wherein a groove width of said outer region circumferential main groove is larger than a groove width of each of said first and second inner region circumferential main grooves, and an axial cutout width of said cutout portion formed in said outer region circumferential main groove is larger than axial cutout widths of said cutout portions formed in said first and second inner region circumferential main grooves.

3. The pneumatic tire of claim 1, wherein said central region is provided with a circumferential sub-groove extending continuously in the circumferential direction and having a groove width of less than 4.0 mm.

4. The pneumatic tire of claim 1, wherein a middle region located between said first inner region circumferential main groove and said second inner region circumferential main groove is provided with middle lateral grooves crossing the middle region in the axial direction of the tire, thereby forming said middle region as a row of middle blocks disposed at intervals in the circumferential direction of the tire, an inner shoulder region located between said second inner region circumferential main groove and a ground contact edge of the inner region is provided with inner lateral grooves crossing the inner shoulder region in the axial direction of the tire, thereby forming said inner shoulder region as a row of inner blocks disposed at intervals in the circumferential direction of the tire, and the number of middle blocks formed is the same as the number of inner blocks formed, and as to a middle block and an inner block which are adjacent to each other in the axial direction of the tire, position of the center of gravity of the middle block and position of the center of gravity of the inner block are shifted from each other in the circumferential direction of the tire, and the shift length is from 35 to 65% of an average pitch length obtained by dividing a circumferential length of the middle region by the number of blocks formed.

5. The pneumatic tire of claim 4, wherein said middle lateral grooves have a groove depth gradually decreased from a ground contact edge side toward a tire equator side.

6. The pneumatic tire of claim 1, wherein each of said inclined main groove is provided, at both intersection parts at which groove wall surfaces of the inclined main groove intersect with the tread surface, with cutout portions, and the distance from the ground contact edge to an axially inner end of said cutout portion of the inclined main groove is at most 15% of the tread ground contact width TW.

7. The pneumatic tire of claim 1, wherein a tread profile in a meridian cross section of the tire including the tire axis is dissimilated between the outer region and the inner region, and a distance Lo from the tire equator to the ground contact edge on the vehicle outer side is smaller than a distance Li from the tire equator to the ground contact edge on the vehicle inner side.

* * * * *